(12) United States Patent
Lalam et al.

(10) Patent No.: US 12,507,192 B2
(45) Date of Patent: Dec. 23, 2025

(54) METHOD FOR MANAGING THE ASSOCIATION WITH A WIRELESS NETWORK OF STATIONS SUPPORTING VARIOUS INCREMENTAL VERSIONS OF A TECHNOLOGY TO A WIRELESS NETWORK

(71) Applicant: SAGEMCOM BROADBAND SAS, Rueil-Malmaison (FR)

(72) Inventors: Massinissa Lalam, Rueil Malmaison (FR); Olivier Payen, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 159 days.

(21) Appl. No.: 17/641,359

(22) PCT Filed: Sep. 25, 2020

(86) PCT No.: PCT/EP2020/076961
§ 371 (c)(1),
(2) Date: Mar. 8, 2022

(87) PCT Pub. No.: WO2021/063838
PCT Pub. Date: Apr. 8, 2021

(65) Prior Publication Data
US 2024/0049158 A1   Feb. 8, 2024

(30) Foreign Application Priority Data
Sep. 30, 2019   (FR) ...................................... 1910821

(51) Int. Cl.
*H04W 60/04* (2009.01)
*H04W 60/06* (2009.01)
(52) U.S. Cl.
CPC ........... *H04W 60/04* (2013.01); *H04W 60/06* (2013.01)

(58) Field of Classification Search
CPC .............................. H04W 60/04; H04W 60/06
See application file for complete search history.

(56) References Cited

U.S. PATENT DOCUMENTS 8,223,721 B2 * 7/2012 Berglund .......... H04W 36/0055
370/332
10,499,282 B1 * 12/2019 Kamath ................ H04W 76/15
(Continued)

OTHER PUBLICATIONS

"Infrastructure functional model overview" Local and Metropolitan Area Networks-Speific Requirements; IEEE; 2012; pp. 84, 381, 382, 423, 424.
(Continued)

*Primary Examiner* — Charles N Appiah
*Assistant Examiner* — Nicole M Louis-Fils
(74) *Attorney, Agent, or Firm* — Williams Mullen; R. Brian Drozd

(57) ABSTRACT

A method for managing by management equipment including a first access point of a first network and a second access point of a second network, the first network having functionalities superior to the second network, each access point sending beacons, a station being able to process the beacons sent by the first and second access points or being able to process only the beacons sent by the second access point, the second access point performs the steps of: receiving an association request coming from a station, checking whether the station is able to process the beacon sent by the first access point, rejecting the association request if the station is able to process the beacons sent by the first access point, and associating the station if the station is not able to process the beacons sent by the first access point.

9 Claims, 8 Drawing Sheets

(56) References Cited

U.S. PATENT DOCUMENTS

| | | | |
|---|---|---|---|
| 2004/0076134 A1* | 4/2004 | Barber | H04W 88/08 |
| | | | 370/349 |
| 2012/0230305 A1 | 9/2012 | Barbu et al. | |
| 2013/0242965 A1* | 9/2013 | Horn | H04W 28/0231 |
| | | | 370/338 |
| 2015/0350974 A1* | 12/2015 | Patil | H04W 36/00835 |
| | | | 370/331 |
| 2016/0323780 A1* | 11/2016 | Bhanage | H04W 76/18 |
| 2017/0155552 A1* | 6/2017 | Lee | H04W 40/36 |
| 2017/0332334 A1* | 11/2017 | Liu | H04W 52/265 |
| 2017/0347311 A1* | 11/2017 | Iyer | H04W 68/02 |
| 2018/0310240 A1 | 10/2018 | Kannan | |
| 2020/0037309 A1* | 1/2020 | Sengupta | H04L 5/005 |
| 2020/0404557 A1* | 12/2020 | Aio | H04W 36/08 |
| 2021/0076369 A1* | 3/2021 | Nakahira | H04B 7/024 |

OTHER PUBLICATIONS

Dec. 14, 2020 Search Report issued in International Patent Application No. PCT/EP2020/076961.

Apr. 5, 2022 International Preliminary Report on Patentability issued in International Patent Application No. PCT/EP2020/076961.

* cited by examiner

METHOD FOR MANAGING THE ASSOCIATION WITH A WIRELESS NETWORK OF STATIONS SUPPORTING VARIOUS INCREMENTAL VERSIONS OF A TECHNOLOGY TO A WIRELESS NETWORK

TECHNICAL FIELD

The present invention relates to the field of the management of wireless networks and more particularly the management of the connection to said networks of stations supporting various incremental versions of a wireless technology.

PRIOR ART

Some communication protocols such as Wi-Fi technology have an incremental nature enabling one version to be compatible with another older version and/or with a more recent version. The development of such incremental technologies enables terminals or stations supporting a first version to connect to a gateway supporting another version without requiring an update. Thus it is possible to develop the technology by offering new functionalities without preventing a station not benefiting from the new functionalities to connect. For example, a Wi-Fi residential gateway based on the IEEE 802.11ax amendment (or "Wi-Fi 6"), and having only a network dedicated to private use of the subscriber, establishes a wireless network that supports the 802.11ax version. Through the incremental nature of Wi-Fi technology, the residential gateway also supports the previous versions such as 802.11ac ("Wi-Fi 5") on the 5 GHz band and 802.11n ("Wi-Fi 4") on the 2.4 and 5 GHz bands. However, problems of interoperability may arise with stations supporting only one of the previous versions, for example for reasons relating to a particular implementation. This is because beacons in accordance with the 802.11ax amendment sent by the residential gateway must indicate the support of the current version 802.11ax as well as of all the previous versions supported. Said beacons then comprise numerous data. A station designed to process only beacons comprising a quantity of data smaller than that of beacons in accordance with the 802.11ax amendment cannot therefore connect to the network sent by the residential gateway.

In order to limit the problems of interoperability, it is possible to intentionally limit the technology supported by the network, for example by choosing to send a network supporting only the 802.11ac version on the 5 GHz band. Stations supporting the more recent version 802.11ax can also connect thereto. However, such stations cannot then benefit from the latest functionalities offered.

It is also possible to create, within the same residential gateway and on the same frequency band, a second network intentionally limited to a technology of a lower version so that the stations supporting only this technology can connect, for example by choosing to create a second network supporting only the 802.11ac version on the 5 GHz band in addition to a first network supporting the 802.11ax version. However, nothing prevents 802.11ax stations from connecting to the second network, preventing them in fact from benefiting from the latest functionalities offered.

The same problem exists also in the deployment on the 5 GHz band of a first 5G NR-U (3GPP) network and a second 4G LTE-U (MultiFire Alliance) network.

It is desirable to overcome these drawbacks of the prior art. It is in particular desirable to provide a solution that enables a gateway or equipment managing networks to provide interoperability with stations having various incremental versions of a communication protocol while guaranteeing, for each station, access to the most recent version available.

DISCLOSURE OF THE INVENTION

One object of the present invention is to propose a method for managing, by management equipment, at least a first and a second wireless network, the equipment managing wireless networks comprising a first access point of the first wireless network and a second access point of the second wireless network, the first wireless network having functionalities and/or performances superior to the second wireless network, each access point sending beacons enabling a station located in the coverage area of said beacons to associate itself with the wireless network of said access point, at least one station being located in the coverage area of the first and second wireless networks, the at least one station being able to process the beacons sent by the first and second access points or being able to process the beacons sent by the second access point and not being able to process the beacon sent by the first access point. The method comprises the steps, performed by the second access point, of: receiving an association request coming from the at least one station, checking whether the at least one station is able to process the beacons sent by the first access point, rejecting the association request if said at least one station is able to process the beacons sent by the first access point, and associating the at least one station if the at least one station is not able to process the beacons sent by the first access point.

Thus the network-managing equipment makes it possible to ensure interoperability with stations having various incremental versions of a communication protocol and, for each station, guarantees an association with the most recent version accessible.

According to a particular embodiment, the check is made by implementing a predetermined number of successive disassociations of the station from the second access point and, if the second access point in response receives, for each disassociation, requests for association of said at least one station with the second wireless network, the at least one station is not able to process the beacons sent by the first access point.

According to a particular embodiment, the method furthermore comprises the steps of: transferring an environment analysis request to the station, and receiving, from the at least one station, a message comprising access-point identifiers detected by the at least one station; the check being made from identifiers included in the message received.

According to a particular embodiment, the second access point implements the check from a table in memory comprising at least one item of information indicating whether the at least one station is able to process the beacons sent by the first access point, the at least one item of information having been stored during a previous association of said station.

According to a particular embodiment, if the at least one station is not able to process the beacons sent by the first access point, the method furthermore comprises the step of transferring, to the user of the station, a message inviting implementing a software update or changing station to allow access to the first wireless network.

According to a particular embodiment, the method furthermore comprises the steps of: degrading the performances of the signal sent by the second access point, the degradation of the performances being implemented by a drop in transmission power and/or by a reduction in the modulations used for transmitting data and/or by a reduction in the number of antennas used for transmitting data, and re-establishing the performances of the signals sent by the second access point if the at least one station is not able to process the beacons sent by the first access point.

According to a particular embodiment, the first wireless network and the second wireless network are Wi-Fi networks, the first wireless network supporting an amendment based on the IEEE 802.11 standard, the second wireless network supporting an amendment based on the IEEE 802.11 standard older than that of the first wireless network.

The invention also relates to a computer program product that comprises instructions causing the implementation, by an access point of equipment managing a wireless network, of the method, when said instructions are implemented by a processor of said wireless-network managing equipment.

The invention also relates to a storage medium storing a computer program comprising instructions causing the implementation, by an access point of a wireless-network managing equipment, of the method, when said instructions are read and implemented by a processor of said wireless-network managing equipment.

The invention also relates to equipment managing at least one first and one second wireless network, the wireless-network managing equipment comprising a first access point of the first wireless network and a second access point of the second wireless network, the first network having functionalities and/or performances superior to the second wireless network, each access point sending beacons enabling a station located in the coverage area of said beacons to associate with the wireless network of said access point, at least one station being located in the coverage area of the first and second wireless networks, the at least one station being able to process the beacons sent by the first and second access point or being able to process the beacons sent by the second access point and not being able to process the beacons sent by the first access point, the second access point comprises: means for receiving an association request coming from the at least one station, means for verifying whether the at least one station is able to process the beacons sent by the first access point, means for rejecting the association request if the at least one station is able to process the beacons sent by the first access point, and means for associating the at least one station if the at least one station is not able to process the beacons sent by the first access point.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
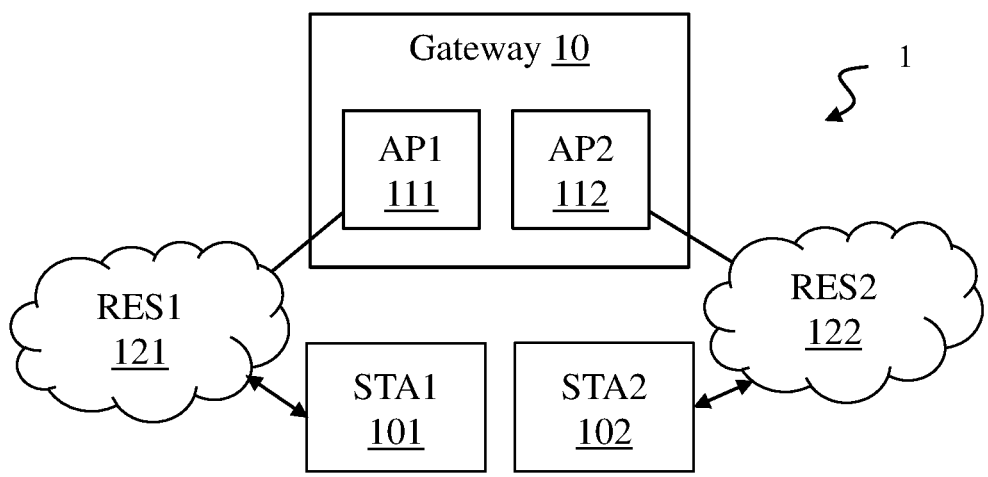
FIG. 1 illustrates schematically a wireless communication system wherein the present invention is implemented.

FIG. 1 thus illustrates schematically a wireless communication system 1 wherein the present invention is implemented.

The present invention is described in an example of networks of the IEEE 802.11 type. The present invention is also applicable to cellular networks, for example in the deployment on a 5 GHz band of a first 5G NR-U (3GPP) network and of a second 4G LTE-U (MultiFire Alliance) network.

The wireless communication system 1 comprises network-management equipment. The network-management equipment can manage a plurality of local area networks such as wireless networks or WLANs (Wireless Local Area Networks) on the same radio channel and comprise at least two access points, each access point being connected to a network. A network is distinguished from other networks by a unique address called "BSSID" ("Basic Service Set IDentifier"). In the example embodiment presented here, the network-management equipment is a domestic gateway 10 such as a residential gateway comprising two access points AP1 111 and AP2 112 that are each responsible for a wireless network. The first access point AP1 111 manages a first radio or Wi-Fi network RES1 121 and a second access point AP2 112 manages a second network RES2 122. The first network RES1 121 comprises a greater number of functionalities and/or offers performances superior to those of the second network RES2 122. For example, if the gateway 10 supports the 802.11ax (or "Wi-Fi 6") amendment, the first network RES1 121 managed by the first access point AP1 111 has characteristics corresponding to the 802.11ax amendment and the second access point AP2 112 manages a second network RES2 122 the characteristics of which correspond to the 802.11ac (or "Wi-Fi 5") amendment, older than the 802.11ax amendment.

The wireless communication system 1 also comprises one or more clients identified by stations STA1 101 and STA2 102, located in the coverage area of the first and second networks RES1 121, RES2 122, and which wish to connect to the gateway 10 via a wireless network. Each access point sends beacons to at least one station STA1 101, STA2 102. A client, such as the first station STA1 101, supports a Wi-Fi technology version enabling it to connect to the first network RES1 121. The station STA1 101 therefore supports either the recent version supported by the gateway 10, or an older version that is compatible with the recent version because of the incremental nature of Wi-Fi technology.

On the other hand, a client such as the second station STA2 102 supports only a Wi-Fi technology version that is older than the recent version supported by the gateway 10 and cannot connect to the first network RES1 121 because of problems of interoperability. For example, the second station STA2 102 cannot detect beacons sent by the first access point AP1 111 because of the quantity of data included in the beacon. This is because such beacons indicate the support of the recent version, corresponding for example to the 802.11ax amendment, but also the support of previous versions, such as the 802.11ac, 802.11n and 802.11a amendments on the 5 GHz band and 802.11n, 802.11g and 802.11b on the 2.4 GHz band, and are consequently builder than beacons supporting the 802.11ac amendment and the previous ones on the 5 GHz or 802.11n band and the previous ones on the 2.4 GHz band. For example, a station designed to process only beacons comprising a quantity of data smaller than that of beacons in accordance with the 802.11ax amendment cannot process these beacons.

The second station STA2 102 can however detect beacons sent by the second access point AP2 112 and can therefore connect to the second network RES2 122.

In the present invention, the second access point AP2 112 can optionally degrade the operating mode of the second network RES 122 to prompt the first station STA1 101 to connect to the first network RES1 121, thus enabling it to benefit from the most recent functionalities that are accessible to it.

In a particular embodiment, the gateway 10 comprises at least three access points each managing a network. Each network supports a different Wi-Fi technology version. A station is prompted to connect to the network the Wi-Fi technology version of which is the most recent version accessible to said station. The extension of the present invention to more than two access points is a minor detail, the objective being to prompt a station to connect to the network the Wi-Fi technology version of which is the most recent version accessible to said station.

Figure 2:
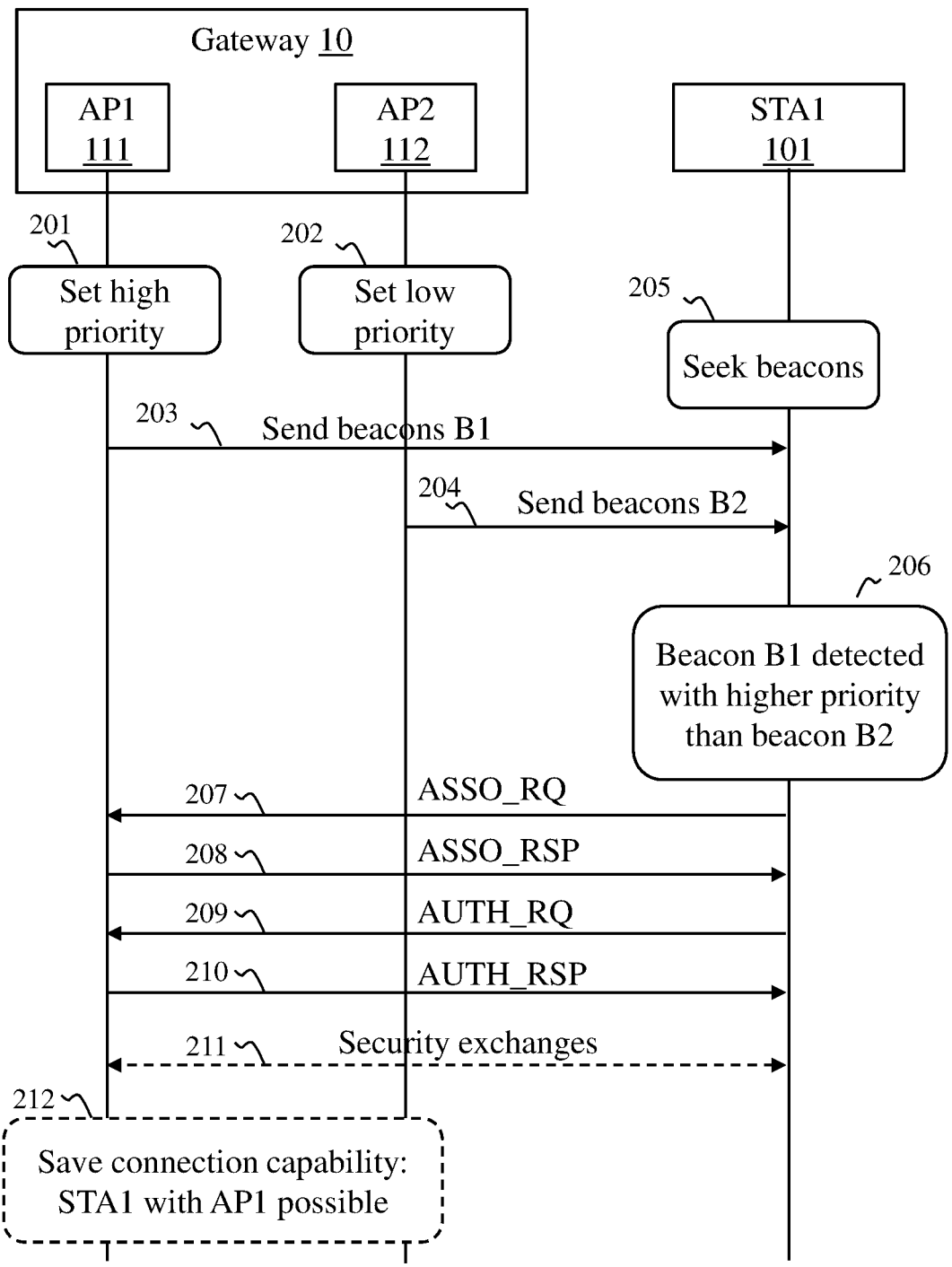
FIG. 2 illustrates schematically exchanges of messages between a gateway comprising two access points respectively managing a first network and a second network, and a first station.

FIG. 2 illustrates schematically exchanges of messages between the gateway 10 and the first station STA1 101.

In steps 201 and 202, a priority is attributed to the first and second networks RES1 121 and RES2 122 so that the first network RES1 121 supporting the recent version has priority with respect to the second network RES2 122 supporting an earlier version. In general terms, if the gateway 10 comprises at least three access points, the priority attributed to a network increases when the version supported by the network is more recent.

The first network RES1 121 is therefore set to high priority in the step 201 and the second network RES2 122 is set to low priority in the step 202. The priority of the second network RES2 122 is reduced by degrading the performances of the signals sent by the second access point AP2 122. For example, the first access point AP1 111 sends beacons with a maximum signal-transmission power while the second access point sends beacons with a signal-transmission power lower than those sent by the first access point AP1 111. Alternatively, the priority of the networks RES1 121 and RES2 122 can be adjusted by modifying the quantity of spatial streams enabling a network with a higher priority to send via a larger number of antennas and thus, by multiplying the number of beams for transmitting data, to have a higher transmission rate. The priority of the networks RES1 121 and RES2 122 may alternatively be adjusted by modifying the transmission/reception rate of the maximum network signalled by means of modulation and coding schemes in the beacon, so as to support a higher transmission rate for networks with a higher priority and to support a lower transmission rate for networks with a lower priority.

In steps 203 and 204, each access point AP1 111 and AP2 112 sends respectively beacons of a first type B1 and of a second type B2 corresponding to the respective networks RES1 121 and RES2 122.

In a step 205, the first station STA1 101 initiates a search for beacons in order to identify available networks. In a step 206, the first station STA1 101 detects the beacons of first and second types B1 and B2 sent by the respective two access points AP1 111 and AP2 112. Furthermore, the first station STA1 101 detects the beacons of a first type B1 with a higher priority than the beacons of a second type B2. For example, the first station STA1 101 detects the beacons of a first type B1 with a higher signal power than the beacons of a second type B2. The first station STA1 101 is thus prompted to select the network offering the highest performances in accordance with a network selection algorithm that it has available internally.

The first station STA1 101 then seeks to associate with the first network RES1 121, identified with a higher priority. The first station STA1 101 exchanges messages with the first access point AP1 111 following an association procedure ASSOCIATION comprising steps 207 to 211. In a step 207, the first station STA1 101 transmits an association request ASSO_RQ to the first access point AP1 111. The first access point AP1 111 next sends, in a step 208, an association response ASSO_RSP to the first station STA1 101. In a step 209, the first station STA1 101 then transmits an authentication request AUTH_RQ to the first access point AP1 111 and the first access point AP1 111 sends to the first station STA1 101 an authentication response AUTH_RSP. In an optional step 211, the first station STA1 101 and the first access point exchange security messages such as encryption keys in order to protect the subsequent transmissions.

Thus, because of a priority level of the first network RES1 121 higher than the priority level of another network sent by the gateway 10, for example the second network RES2 122, the first station STA1 101 preferentially connects to said first network RES1 121 and can thus benefit from the most recent functionalities supported by the Wi-Fi technology version available to it.

In an optional step 212, the gateway 10 saves the connection capacity of the first station STA1 101 by recording the fact that said first station STA1 101 is capable of connecting to the first network RES1 121 on the first access point AP1 111.

Figure 3:
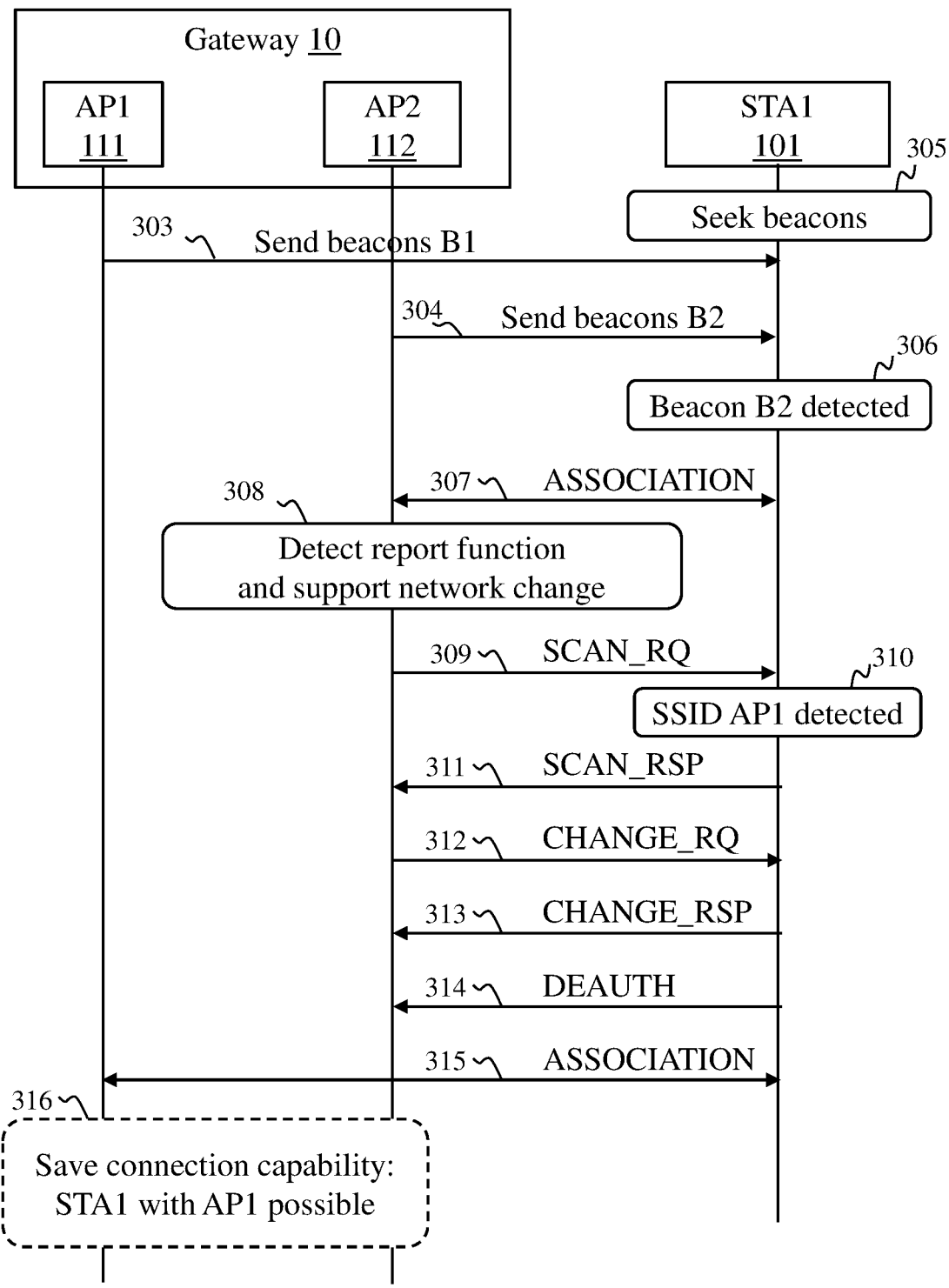
FIG. 3 illustrates schematically exchanges of messages between the gateway and the first station in a case where the first station connects to the second network.

FIG. 3 illustrates schematically exchanges of messages between the gateway 10 and the first station STA1 101 in a case where the first station STA1 101 seeks to connect initially to the second network RES2 122. As previously described in relation to FIG. 2, each access point AP1 111 and AP2 112 respectively sends beacons of a first type B1 and of a second type B2 in respective steps 303 and 304; and the first station STA1 101 initiates a search for beacons in a step 305. In some cases, the first station STA1 101 seeks to connect to the second network RES2 122. For example, the network priorities are not distinct at the moment when the first station STA1 101 seeks to connect or for another reason the beacons of a first type B1 are not detected at the moment when the first station STA1 101 searches for beacons.

In a step 307, the first station STA1 101 exchanges messages with the access point AP2 112 in order to associate therewith following the association procedure ASSOCIATION corresponding to the steps 207 to 211 described previously in relation to FIG. 2, and associates with the second network RES2 122.

In a step 308, the second access point AP2 112 identifies whether the first station STA1 101 has an environment report function such as the basic measurement function of the IEEE 802.11k amendment (Measurement Request/Report). An environmental report function enables a station STA1 101, STA2 102 to analyse its environment and to send, to the access point with which it is associated, information relating to other neighbouring access points. A station STA1 101, STA2 102 can analyse its environment passively, by analysing beacons broadcast by neighbouring networks, or actively, by sending a presence request to a network the identifier of which is known.

In the step 308, the second access point AP2 112 furthermore identifies whether the station STA1 101 has a network change support as used by a specific transition frame of the IEEE 802.11v amendment (BSS Transition Management Request/Report).

The network change support enables an access point AP1 111, AP2 112 to request any station STA1 101, STA2 102 associated with it to associate with another access point by sending a transition frame containing the identity of the other access point.

In the case where the environment report function is detected, the second access point AP2 112 can then, in a step 309, send an environment analysis request SCAN_RQ to the first station STA1 101. The environment analysis request SCAN_RQ asks to identify networks available on the same channel as that of the second network RES2 122 to which the second station STA2 102 is connected and bearing the network name or SSID (Service Set Identifier) corresponding to the first network RES1 121. In a step 310, the first station STA1 101 detects the first network RES1 121. For example, if the normal RES1 121 and limited RES2 122 networks have the same SSID, the first station STA1 101 detects two networks corresponding to said SSID. In another example, if the first network RES1 121 and the second network RES2 122 have different SSIDs, the first station STA1 101 detects a single network.

In a step 311, the first station STA1 101 transmits the result of the environment analysis SCAN_RSP to the second access point AP2 112.

In the case where the network change support is detected, the second access point AP2 112, in a step 312, sends a network change request CHANGE_RQ to the first station STA1 101 requesting it to disassociate from the second network RES2 122 in order to reassociate with the first network RES1 121. The network change request CHANGE_RQ may for example be implemented by a specific transition frame such as the one supported by the IEEE 802.11v amendment (BSS Transition Management). The first station STA1 101 accepts the network change request CHANGE_RQ and may optionally warn the access point AP2 112 of this in a step 313 by responding by a network change response CHANGE_RSP and by sending in a step 314 an authentication deletion request DEAUTH to the second access point AP2 112. If the access point AP2 112 does not receive a network change response CHANGE_RSP or an authentication deletion request DEAUTH, then the second access point AP2 112 disassociates the first station STA1 101 from the second network RES2 122.

In the case where the environment report function is not detected and/or the network change support is not detected by the second access point AP2 112 at the step 308, the steps 309 to 314 are replaced by a step, not illustrated here, during which the second access point AP2 112 disassociates the first station STA1 101 from the second network RES2 122. If the first station STA1 101 seeks to reconnect to the second network RES2 122, the second access point AP2 112 will reiterate the dissociation of said first station STA1 101 until it seeks to connect to the first network RES1 121 or until a maximum number of disassociations is reached, as described hereinafter in relation to FIG. 5.

In a following step 315, the first station STA1 101 exchanges messages with the access point AP1 111 in order to associate with the first network RES1 121 following the association procedure ASSOCIATION described in FIG. 2.

In an optional step 316, the gateway 10, in a similar manner to the step 212, saves the connection capability of the first station STA1 101 by recording the fact that said first station STA1 101 is capable of connecting to the first network RES1 121 with the first access point AP1 111.

Figure 4:
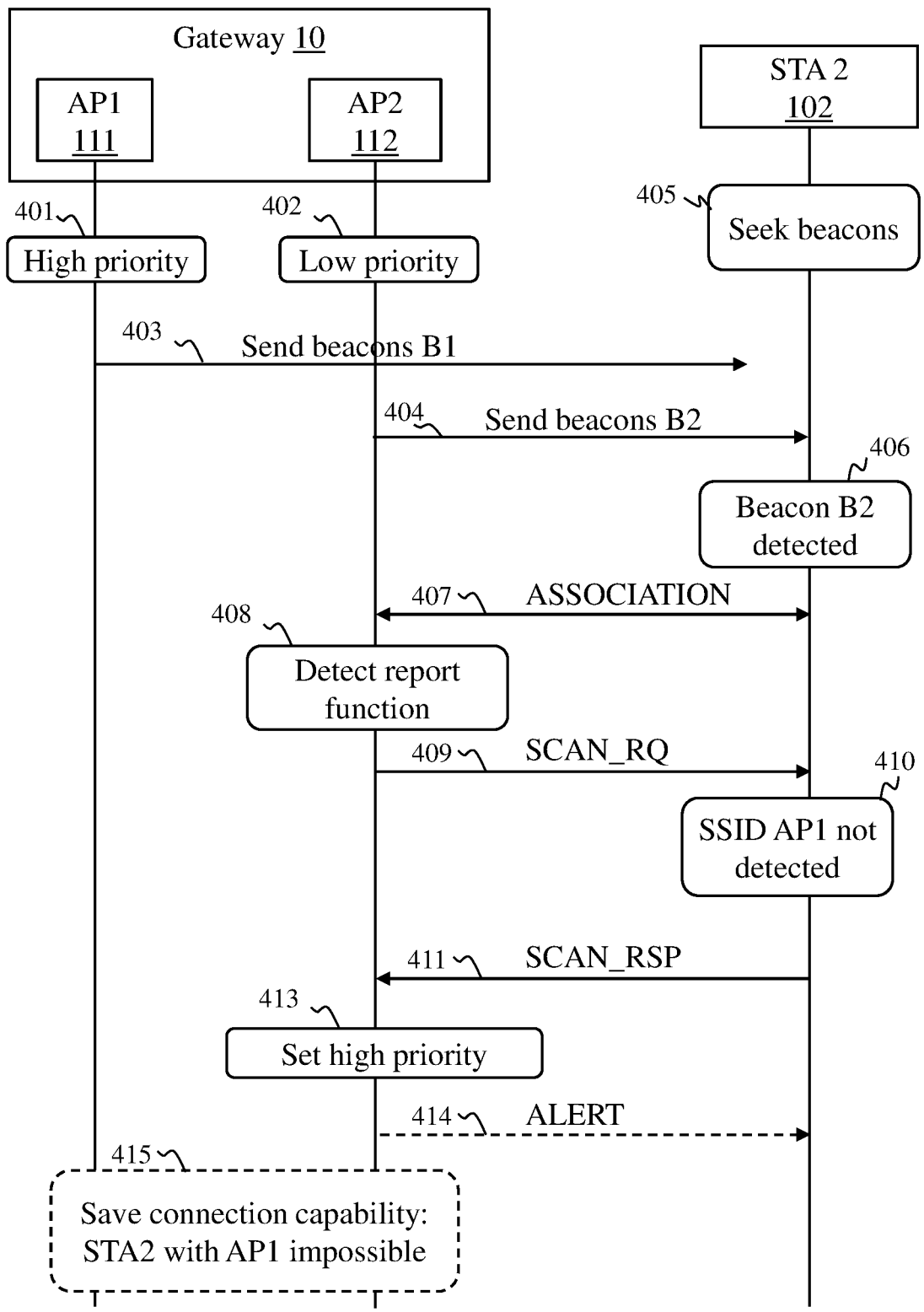
FIG. 4 illustrates schematically exchanges of messages between the gateway and a second station.

FIG. 4 illustrates schematically exchanges of messages between the gateway 10 and the second station STA2 102 in a case where the second station STA2 102 has an environment report function. In steps 401 and 402, each access point AP1 111 and AP2 112 adjusts the priority of the network that it is managing, first network RES1 121 and second network RES2 122, in the same way as at the respective steps 201 and 202 of FIG. 2. As previously described, each access point AP1 111 and AP2 112 furthermore sends respectively beacons of a first type B1 and of a second type B2 corresponding to the respective normal RES1 121 and limited RES2 122 networks, in respective steps 403 and 404. In a step 405, the second station STA2 102 initiates a search for beacons. In a step 406, the second station STA2 102 detects the beacons of a second type B2 sent by the access point AP2 112 and corresponding to the second network RES2 122. The second station STA2 102 cannot detect the beacons of a first type B1 corresponding to the first network RES1 121 because of a problem of interoperability as described in relation to FIG. 1.

In a step 407, the second station STA2 102 exchanges messages with the access point AP2 112 in accordance with the association procedure ASSOCIATION and associates with the second network RES2 122.

In a step 408, similar to the step 308, the second access point AP2 112 identifies whether the second station STA2 102 has an environmental report function. In the case where an environment report function is detected, the second access point AP2 112 sends to the second station STA2 102 in a step 409 an environmental analysis request SCAN_RQ, similarly to the step 309. A case where no environment report function is detected is described below in relation to FIG. 5.

In a step 410, the second station STA2 102 performs the analysis and does not detect the first access point AP1 111. For example, if the normal RES1 121 and limited RES2 122 networks have the same SSID, the second station STA2 102 detects a single network corresponding to said SSID. In another example, if the first network RES1 121 and the second network RES2 122 have different SSIDs, the second station STA2 102 does not detect anything.

In a step 411, the second station STA2 102 transmits the result of the environment analysis to the second access point AP2 112.

In a step 413, since the first network RES1 121 is not detected by the second station STA2 102, the second access point AP2 112 increases the priority of the second network RES2 122 by re-establishing the performances of the signals sent by the second access point AP2 123. For example, the second access point increases the transmission power of the signal to the same level as that of the first network RES1 121. Thus the second station STA2 102 benefits from a service comparable to that which it would have on the first network RES1 121 if it could connect thereto. As soon as the second network RES2 122 no longer has a station connected, for example when the second station STA2 102 disconnects and no other station is connected, the second access point AP2 112 once again reduces the priority of the second network RES2 122.

In an optional step 414, the second access point AP2 112 transmits an alert message ALERT to the second station STA2 102 making it possible to warn a user of said second station STA2 102 of a problem of interoperability and indicating to him to check the wireless-connection management software, also referred to as a driver, and/or to change his equipment. The user may for example be warned by means of a communication interface of the residential gateway such as a screen or a loudspeaker, or via a captive portal in the context of an internet access.

In an optional step 415, the gateway 10 saves the connection capability of the second station STA2 102 by recording the fact that said second station STA2 102 is incapable of connecting to the first network RES1 121.

Figure 5:
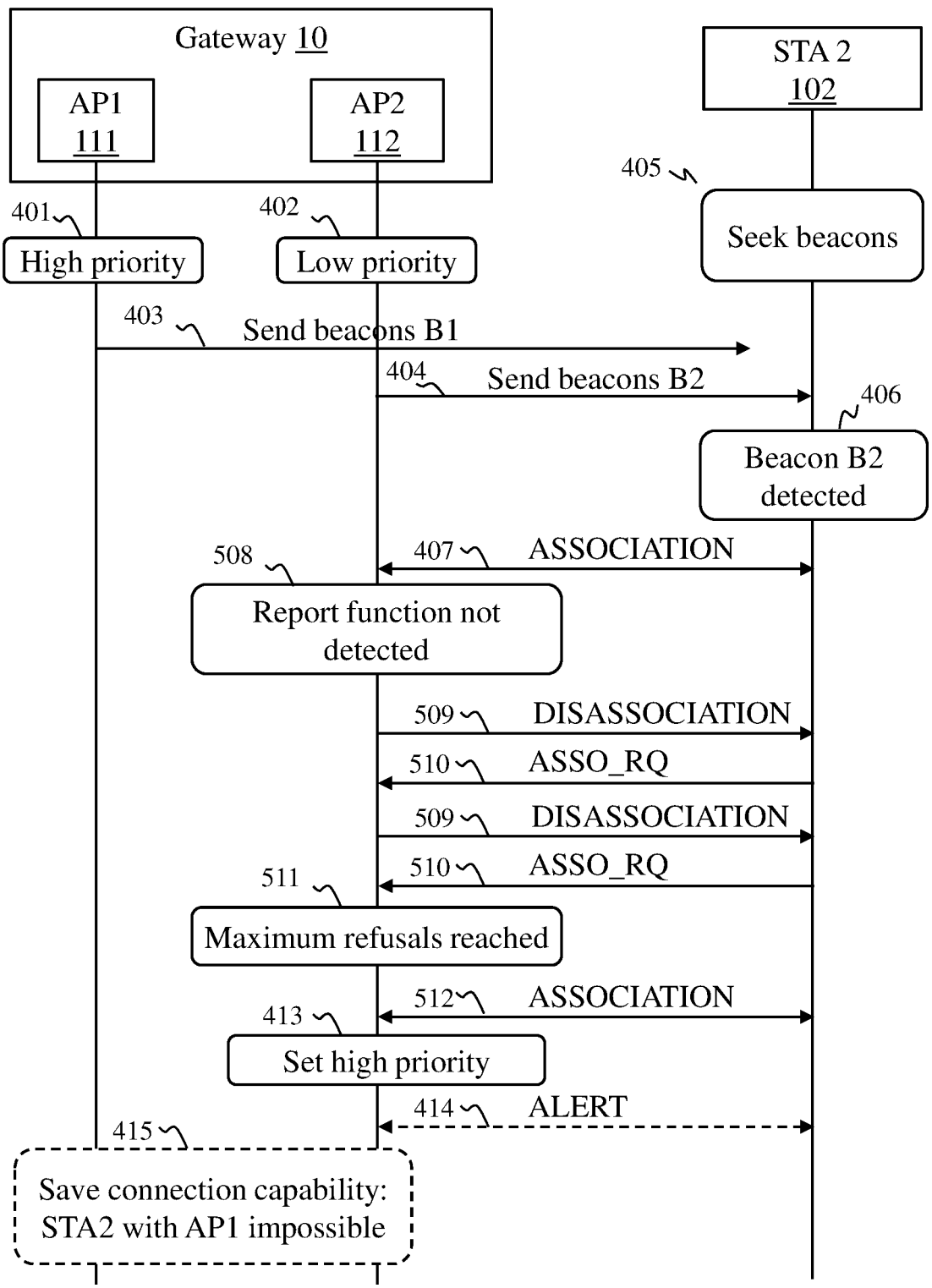
FIG. 5 illustrates schematically exchanges of messages between the gateway and the second station in a case where the second station does not support an environment report function.

FIG. 5 illustrates schematically exchanges of messages between the gateway 10 and the second station STA2 102 in the case where the second station STA2 102 does not have an environment report function.

The steps 401 to 407 are the same as those described previously in relation to FIG. 4. At the end of the step 407, the second station STA2 102 is connected to the second network RES2 122.

In a step 408, the second access point AP2 112 identifies the fact that the second station STA2 102 does not have an environment report function.

In a following step 509, the second access point AP2 112 disassociates the second station STA2 102 by sending a disassociation message DISASSOCIATION. In parallel, the second access point AP2 112 initialises a counter that increments itself each time a disassociation message DISASSOCIATION is sent. Alternatively, the second access point AP2 112 does not respond to the association request ASSO_RQ from the second station STA2 102 and the incremental counter counts each association request ASSO_RQ that has been received and has remained without response.

In a step 510, the second station STA2 102 seeks to reassociate with the second network RES2 122 since it does not detect any beacons of a first type B1 coming from the first network RES1 121. The second station STA2 102 therefore transmits, to the second access point AP2 112, an association request ASSO_RQ.

The second access point AP2 112 then reiterates the step 509 in order to refuse the association request ASSO_RQ since the second station STA2 102 reiterates the step 510 and once again sends the association request ASSO_RQ.

In a step 511, the value of the incremental counter exceeds a maximum number of predefined connection attempts. The second access point AP2 112 then stops refusing the association requests ASSO_RQ from the second station STA2 102. Alternatively, the second access point AP2 112 uses a time counter and stops refusing the association requests ASSO_RQ from the second station STA2 102 when the time counter reaches a predefined maximum duration.

In a step 512, the second station STA2 102 sends an association request ASSO_RQ, which is accepted by the second access point AP2 112, and exchanges of messages are established between the second station STA2 102 and the second access point AP2 112 in accordance with the association procedure ASSOCIATION. The second station STA2 102 thus associates with the second network RES2 122.

The following steps 413, 414 and 415, described previously, make it possible to increase the priority of the second network RES2 122, to alert the station STA2 102 to a problem of interoperability and to save the incapability of connection of the second station STA2 102 with the first access point AP1 111.

Figure 6:
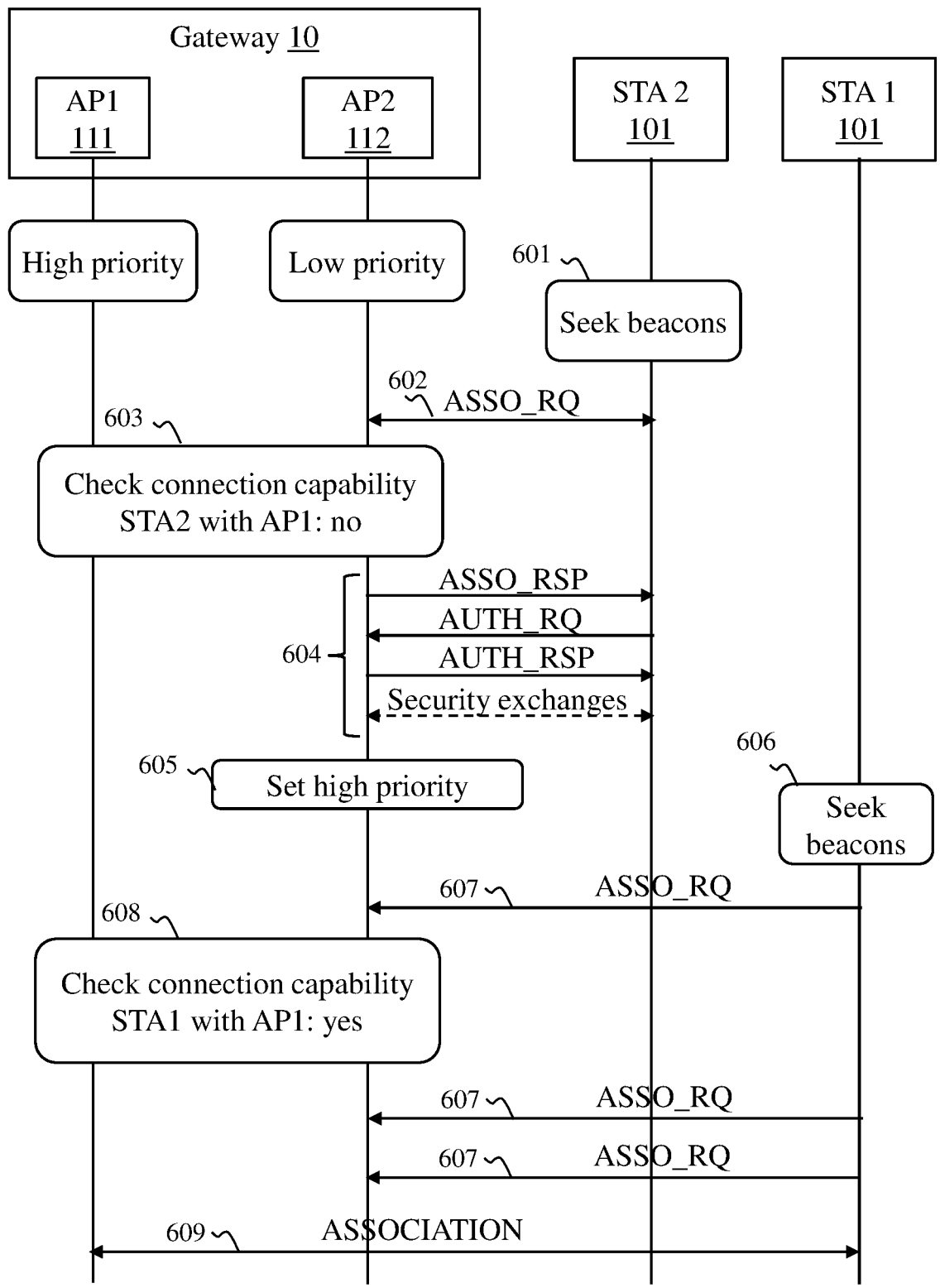
FIG. 6 illustrates schematically exchanges of messages between the environment and the first and second stations.

FIG. 6 illustrates schematically exchanges of messages between the gateway 10 and the first and second stations STA1 101 and STA2 102 in an example of management of a history of connections. When each station STA1 101 and STA2 102 connects for the first time to the gateway 10, the gateway 10 saves, in table form, the corresponding capability of connection to the station STA1 101 or STA2 102, as presented at the steps 212 or 316 for the station STA1 101 or at the step 415 for the station STA2 102. The gateway 10 thus associates, with each station STA1 101, STA2 102 already known, information on capability of connection of said station STA1 101, STA2 102 to the network RES1 121, RES2 122. FIG. 6 presents more precisely exchanges of messages when the stations STA1 101 and STA2 102 seek to reconnect to the gateway 10. The first network RES1 121 has a high priority set by the first access point AP1 111 and the second network RES2 122 has a priority lower than that of the first network RES1 121, set by the second access point AP2 112.

In a step 601, the second station STA2 102 initiates a search for beacons. In a following step 602, after having detected only the beacons of a second type B2 sent by the second access point AP2 112, the second station STA2 102 associates with the second network RES2 122 by exchanges of messages with the second access point AP2 112 according to the association procedure ASSOCIATION.

In a step 603, the second access point AP2 112 recovers, from the table in memory, information on connection capability associated with the second station STA2 102, saved by the gateway 10 during a previous association of the second station STA2 102 with the first network RES1 121 or with the second network RES2 122. The second access point AP2 112 identifies the fact that the second station STA2 102 does not have the capability of connecting to the second network RES1 121 with the access point AP1 111. The connection capability information thus recovered enables the second access point AP2 112 to ensure that the station STA2 102 cannot connect to the first network RES1 121 without needing to send an environment analysis request SCAN_RQ or to dissociate the second station STA2 102 several times from the second network RES2 122.

In a following step 605, the second access point increases the priority of the second network RES2 122.

In a step 606, the first station STA1 101 initiates a search for beacons. The first station STA1 101 can for example detect the two normal RES1 121 and limited RES2 122 networks with the same priority if the priority of the second network RES2 122 has been increased and seeks to connect to the second network RES2 122.

In a step 607, the first station STA1 101 sends an association request ASSO_RQ to the second access point AP2 112.

In a step 608, the second access point AP2 112 recovers, from the table in memory, connection capability information associated with the first station STA1 101, saved by the gateway 10 during the previous association. The second access point AP2 112 identifies the fact that the first station STA1 101 has the capability of connecting to the first network RES1 121. The connection capability information thus recovered enables the second access point AP2 112 to ensure that the first station STA1 101 can connect to the first network RES1 121 without needing to send an environment analysis request SCAN_RQ or to disassociate the first station STA1 101 from the second network RES2 122. The second access point AP2 112 then refuses to respond to each association request ASSO_RQ sent by the first station STA1 101, even if the first station STA1 101 several times reiterates the sending of such an association request ASSO_RQ. Alternatively, the second access point AP2 112 may send a disassociation message DISASSOCIATION to the first station STA1 101 or send a change of network request CHANGE_RQ to the first station STA1 101 requesting it to disassociate from the second network RES2 122 in order to reassociate with the first network RES1 121.

In a step 609, when the first station STA1 101 seeks to connect to the first network RES1 121, the first access point AP1 111 accepts the association request ASSO_RQ. The first station STA1 101 thus associates with the first network RES1 121 in accordance with the association procedure ASSOCIATION.

In a particular embodiment, a periodic test is performed by the second access point AP2 112 to update the connection capability information. For example, the second access point AP2 112 recovers the connection capability information as indicated at the steps 603 and 608 during a predefined time period. At the end of said time period, the second access point AP2 112 no longer recovers the connection capability information but performs exchanges of messages while considering that a station STA1 101, STA2 102 that sends an association request ASSO_RQ seeks to connect for the first time. In order not to encumber the memory of the gateway 10, the connection capability information may also be deleted at the end of each time period. Alternatively, the second access point AP2 112 recovers the connection capability information at the end of each time period, and takes into account only the connection capability information relating to the stations STA1 101, STA2 102 that have already been able to connect to the first network RES1 121. In other words, the second access point AP2 112 considers that a station STA1 101, STA2 102, previously identified by the gateway 10, connects for the first time only if the connection capability information of said station STA1 101, STA2 102 indicates that connecting to the first network RES1 121 is impossible.

Figure 7:
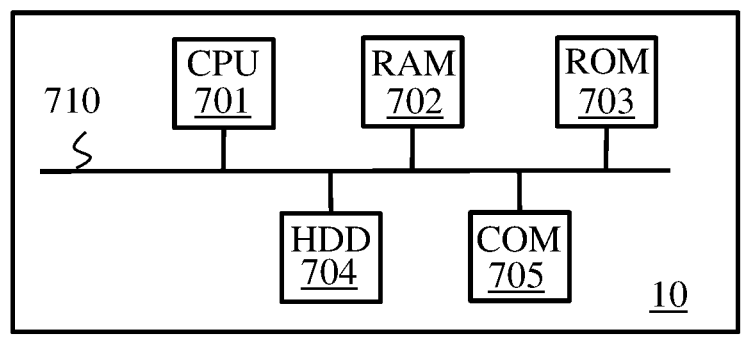
FIG. 7 illustrates schematically the hardware architecture of an access point of the gateway.

FIG. 7 illustrates schematically the hardware architecture of the gateway 10. The gateway 10 then comprises, connected by a communication bus 710; a processor or CPU (central processing unit) 701; a random access memory RAM 702; a read only memory ROM 703; a storage unit 704, such as a hard disk HDD (hard disk drive), or a storage medium reader, such as an SD (Secure Digital) card reader; and an interface COM 705 for communicating with terminals such as the stations STA1 101, STA2 102.

The processor CPU 701 is capable of implementing instructions loaded in the RAM 702 from the ROM 703, from an external memory (such as an SD card), from a storage medium, or from a communication network. When the gateway 10 is powered up, the processor CPU 701 is capable of reading instructions from the RAM 402 and implementing them. These instructions form a computer program causing the implementation, by the processor CPU 701, of all or some of the steps described here in relation to the first or second access point AP1 111, AP2 112. All or some of the steps can thus be implemented in software form by executing a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit). In general terms, the gateway 10 thus comprises electronic circuitry configured for implementing all or some of the steps described here in relation to the access points AP1 111, AP2 112.

Figure 8:
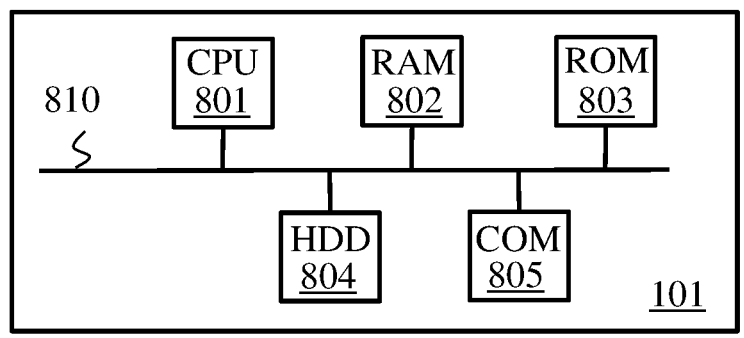
FIG. 8 illustrates schematically the hardware architecture of a station.

FIG. 8 illustrates schematically the hardware architecture of a station STA1 101, the hardware architecture of a second station STA2 102 being identical to that of the station STA1 101. The station STA1 101 then comprises, connected by a communication bus 810; a processor or CPU (central processing unit) 801; a random access memory RAM 802; a read only memory ROM 803; a storage unit 804, such as a hard disk HDD (hard disk drive), or a storage medium reader, such as an SD (Secure Digital) card reader; and an interface COM 805 for communicating with the access points AP1 111, AP2 112 of the gateway 10.

The processor CPU 801 is capable of implementing instructions loaded in the RAM 802 from the ROM 803, from an external memory (such as an SD card), from a storage medium, or from a communication network. When the station STA1 101 is powered up, the processor CPU 801 is capable of reading instructions from the RAM 802 and implementing them. These instructions form a computer program causing the implementation, by the processor CPU 801, of all or some of the steps described here in relation to the station STA1 101. All or some of the steps can thus be implemented in software form by executing a set of instructions by a programmable machine, such as a DSP (digital signal processor) or a microcontroller, or be implemented in hardware form by a machine or a dedicated component, such as an FPGA (field-programmable gate array) or an ASIC (application specific integrated circuit). In general terms, the station STA1 101 thus comprises electronic circuitry configured for implementing all or some of the steps described here in relation to said station STA1 101.

Figure 9:
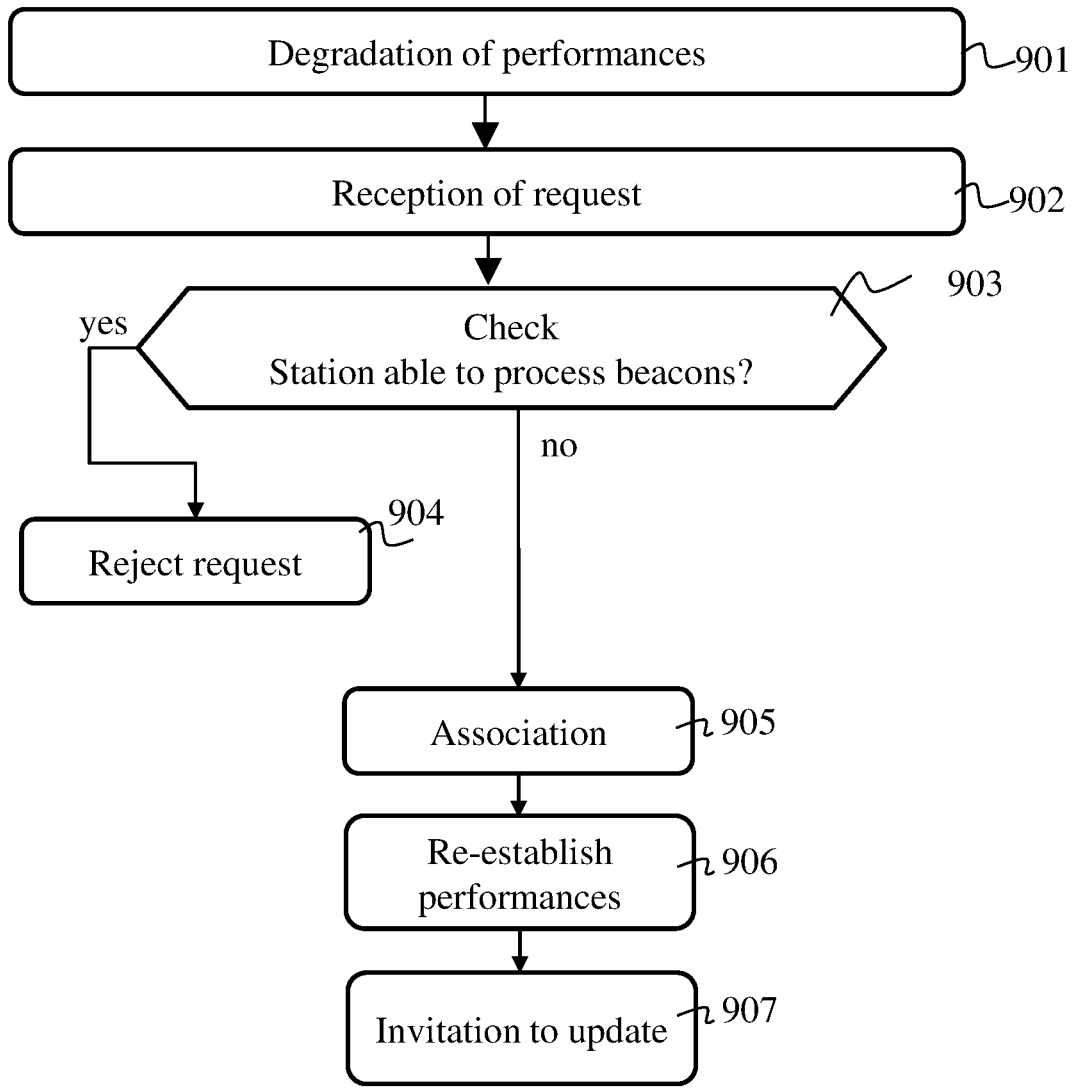
FIG. 9 illustrates schematically a method, implemented by an access point of the gateway, for managing the access of a station to the second network.

FIG. 9 illustrates schematically a method, implemented by the second access point AP2 112 of the gateway 10, managing the access to a station STA1 101, STA2 102 to the second network RES2 122.

In an optional step 901, the second access point AP2 112 degrades the performances of the second network RES2 122 in order to prompt a station STA1 101, STA2 102 to connect to the first network RES1 121, the performances of which are not degraded.

In a step 902, the second access point AP2 112 receives an association request ASSO_RQ coming from a station STA1 101, STA2 102 wishing to connect.

In a following step 903, the second access point implements a check for identifying whether the station STA1 101, STA2 102 wishing to connect is able to process the beacons sent by the first access point AP1 111. If such is the case, a step 904 is performed. Otherwise a step 905 is performed.

In the step 904, the second access point AP2 112 rejects the association request ASSO_RQ received at the step 902. For example, the second access point AP2 112 sends a network-change request CHANGE_RQ to the station STA1 101, STA2 102 wishing to connect. Alternatively, the second access point AP2 112 sends a dissociation message DISASSOCIATION to the station STA1 101, STA2 102 wishing to connect or does not respond to the association request ASSO_RQ.

In the step 905, the second access point AP2 112, having identified the fact that the station STA1 101, STA2 102 wishing to connect is not able to process the beacons sent by the first access point AP1 111, implements an association of the station STA1 101, STA2 102 in question by accepting the association request ASSO_RQ. For example, the second access point AP2 112 sends an association response ASSO_RSP to said station STA1 101, STA2 102.

In a following step 906, and if the step 901 has been performed, the second access point AP2 112 re-establishes the performances of the second network RES2 122 at the same level as that of the first network RES1 121.

In an optional step 907, the second access point AP2 112 sends, to the user of the station STA1 101, STA2 102 an invitation to perform a software update or to change station to allow access to the first network RES1 121. For example, the second access point transmits an alert message ALERT as described previously at the step 414.

The invention claimed is:

1. A method for managing, by management equipment, at least a first and a second wireless network, the method comprising:
   receiving, by a second access point of a second network, an association request coming from at least one station, wherein the management equipment managing wireless networks comprising a first access point of a first wireless network and the second access point of the second wireless network, the first wireless network having functionalities and/or performances superior to the second wireless network, the at least one station being located in respective coverage areas of the first and second wireless networks, the at least one station being able to process beacons sent by the first and second access points or being able to process the beacons sent by the second access point and not being able to process the beacon sent by the first access point,
   associating the at least one station with the second access point,
   receiving beacons sent by the first access point,
   checking, by the second access point, whether the at least one station is able to process the beacons sent by the first access point,
   exchanging, by the second access point, messages with the at least one station in an association procedure,
   sending, by the second access point to the at least one station, a dissociation message for the at least one station to de-associate the at least one station with the second access point if said at least one station is able to process the beacons sent by the first access point.

2. The method according to claim 1, wherein the check is made by implementing a predetermined number of successive disassociations of the station from the second access point and, in response to the second access point in response receiving, for each disassociation, requests for association of said at least one station with the second wireless network, the at least one station is not able to process the beacons sent by the first access point.

3. The method according to claim 1, wherein the method causing the second access point to further perform:
   identifying if the station has environment report capability function which enables the station to analyse its environment and to send back to the access point informations related to other neighbouring access points,
   receiving, from the at least one station, a message comprising access-point identifiers detected by the at least one station, and in that the check is made from identifiers included in the message received.

4. The method according to claim 1, wherein the second access point implements the check from a table in memory comprising at least one item of information indicating whether the at least one station is able to process the beacons sent by the first access point, the at least one item of information having been stored during a previous association of said station.

5. The method according to claim 1, wherein, if the at least one station is not able to process the beacons sent by the first access point, the method causing the second access point to further perform:
   transferring, to the user of the station, a message inviting implementing a software update or changing station to allow access to the first wireless network.

6. The method according to claim 1, the method causing the second access point to further perform:
   degrading the performances of the signal sent by the second access point, the degradation of the performances being implemented by a drop in transmission power and/or by a reduction in the modulations used for transmitting data and/or by a reduction in the number of antennas used for transmitting data,
   re-establishing the performances of the signals sent by the second access point if the at least one station is not able to process the beacons sent by the first access point.

7. The method according to claim 1, wherein the first wireless network and the second wireless network are Wi-Fi networks, the first wireless network supporting an amendment based on the IEEE 802.11 standard, the second wireless network supporting an amendment based on the IEEE 802.11 standard older than that of the first wireless network.

8. A non transitory storage medium that stores a computer program comprising instructions causing the implementation, by an access point of a wireless-network managing equipment, of the method according to claim 1, when the instructions are read and implemented by a processor of the wireless-network managing equipment.

9. An equipment managing at least one first and one second wireless network, the wireless-network managing equipment comprising a first access point of the first wireless network and a second access point of the second wireless network-, wherein the second access point comprises circuitry causing the second access point to implement:
   receiving an association request coming from at least one station, the wireless-network managing equipment comprising the first access point of the first wireless network and the second access point of the second wireless network, the first network having functionalities and/or performances superior to the second wireless network, each access point sending beacons enabling a station located in the coverage area of said beacons to associate with the wireless network of said access point, at least one station being located in the coverage area of the first and second wireless networks, the at least one station being able to process the beacons sent by the first and second access point or being able to process the beacons sent by the second access point and not being able to process the beacons sent by the first access point,
   associating the at least one station with the second access point,
   receiving beacons sent by the first access point,
   verifying whether the at least one station is able to process the beacons sent by the first access point,
   exchanging messages with the at least one station in an association procedure,
   rejecting the association request if the at least one station is able to process the beacons sent by the first access point, and
   sending, by the second access point to the at least one station, a dissociation message for the at least one station to de-associate the at least one station with the second access point if the at least one station is not able to process the beacons sent by the first access point.

\* \* \* \* \*